United States Patent [19]
Kluth et al.

[11] Patent Number: 5,992,250
[45] Date of Patent: Nov. 30, 1999

[54] APPARATUS FOR THE REMOTE MEASUREMENT OF PHYSICAL PARAMETERS

[75] Inventors: Erhard Lothar Edgar Kluth; Malcolm Paul Varnham, both of Alresford, United Kingdom

[73] Assignee: GeoSensor Corp., Houston, Tex.

[21] Appl. No.: 08/824,527

[22] Filed: Mar. 26, 1997

[30] Foreign Application Priority Data

Mar. 29, 1996 [GB] United Kingdom .................... 9606673

[51] Int. Cl.$^6$ ...................................................... G01D 5/26
[52] U.S. Cl. .................... 73/866.5; 340/855.1; 254/134.4
[58] Field of Search ............................... 73/866.5, 865.8; 340/854.9, 855.1, 855.2; 254/134.4, 134.3 FT; 250/227.11; 385/12

[56] References Cited

U.S. PATENT DOCUMENTS

| | | | |
|---|---|---|---|
| 3,612,487 | 10/1971 | Raney et al. | 73/866.5 X |
| 4,644,791 | 2/1987 | Sonoda et al. | 73/866.5 |
| 4,690,006 | 9/1987 | Urata | 73/866.5 |
| 4,854,614 | 8/1989 | Torichigai et al. | 73/866.5 X |
| 4,872,347 | 10/1989 | Okabe et al. | 73/634 |
| 4,934,662 | 6/1990 | Griffioen et al. | 254/134.4 |
| 5,474,277 | 12/1995 | Griffioen | 254/134.4 |
| 5,570,437 | 10/1996 | Kluth et al. | 73/800 X |
| 5,582,064 | 12/1996 | Kluth | 73/1.57 |
| 5,612,499 | 3/1997 | Andrew et al. | 73/866.5 |
| 5,699,996 | 12/1997 | Boyle et al. | 254/134.4 |
| 5,804,713 | 9/1998 | Kluth | 73/623 X |

FOREIGN PATENT DOCUMENTS

| | | | |
|---|---|---|---|
| 191058 | 8/1988 | Japan | 73/866.5 |
| 2284257 | 5/1995 | United Kingdom . | |
| 9461 | 3/1996 | WIPO . | |

OTHER PUBLICATIONS

Derwert Information LTD copyright 1998 month not given but 25th week abstract of GB–2284257A published May 31, 1995.
Patent Abstracts of Japan Grp P008, vol. 4, No. 55, Ab, pub date Apr. 24, 1980 (55–24607) "Tube Inside Flaw Detector".
Patent Abstracts of Japan Grp P165, vol. 6, No. 265, Abs pub date Oct. 2, 1982 (57–160057) "Pipe Body Inspection Device".
Patent Abstracts of Japan Grp P460, vol. 10, No. 147 Abs pub date May 29, 1986 (61–756) "Ultrasonic Flaw Inspector for Pipe".
Patent Abstracts of Japan Grp P852, vol. 13, No. 138 Abs pub date Apr. 16, 1989 (63–305242) "Apparatus for Inspecting Corrosion in Outer Surface of Pipe Body".

Primary Examiner—Thomas P. Noland
Attorney, Agent, or Firm—Reidlaw, L.L.C.; John S. Reid

[57] ABSTRACT

Apparatus for the remote measurement of physical parameters, the apparatus comprises a sensor (1) for sensing one or more physical parameters, an interrogator (2) for interrogating the sensor (1) and making a measurement, a cable (3) for extending between the sensor (1) and the interrogator (2), a conduit (4) for extending to a measurement location (5) and which is of such a cross-sectional size that it is able to accept the cable (3) and the sensor (1), and a cable installer (6) for installing the sensor (1) and the cable (3) through the conduit (4) and for placing the sensor (1) at the measurement location (5), the cable installer (6) being such that it includes a device (7) for propelling a fluid along the conduit (4), and the conduit (4) being such that it contains a lead-in section (8) for providing sufficient fluid drag on the cable (3) as it enters the conduit (4) from the cable installer (6) to ensure that the sensor (1) is able to be transported through the conduit (4).

21 Claims, 11 Drawing Sheets

APPARATUS FOR THE REMOTE MEASUREMENT OF PHYSICAL PARAMETERS

CROSS REFERENCE TO RELATED APPLICATION

This application claims priority to foreign patent application Ser. No. 9606673.3 filed in the United Kingdom on Mar. 29, 1996.

FIELD OF THE INVENTION

The invention relates to apparatus for the remote measurement of physical parameters in which the advantages of optical fibre cables and optical fibre sensors are exploited for use within the oil industry. The invention has important applications for monitoring oil and gas reservoirs, for stack monitoring and monitoring within refineries.

BACKGROUND OF THE INVENTION

As oil and gas reserves have been consumed over the years, the extraction of the oil and gas has become increasingly more difficult under more demanding conditions. Accordingly, there is a need for the reserves to be monitored to a higher quality than hitherto. The potential payback is reducing operating costs and increasing the yield from individual reservoirs. The invention also impacts on operational and environmental safety.

GB-A-2284257 relates to apparatus for the remote measurement of physical parameters. Experience over many installations has shown that the technique is not always reliable especially when deploying optical fibre sensors through steel hydraulic control lines in oil wells where the steel hydraulic control lines contain many bends and curves. The problem is that optical fibre cables can become stalled in the control line which can lead to tangling and possible destruction of the optical fibre cable in the hydraulic control line.

An aim of the present invention is to improve on known apparatus by improving the reliability of the apparatus needed to install and retrieve an optical fibre sensor for the measurement of physical parameters.

SUMMARY OF THE INVENTION

According to a non-limiting embodiment of the present invention, there is provided apparatus for the remote measurement of physical parameters, which apparatus comprises sensing means for sensing one or more physical parameters, interrogation means for interrogating the sensing means and making a measurement, a cable for extending between the sensing means and the interrogation means, a conduit for extending to a measurement location and which is of such a cross-sectional size that it is able to accept the cable and the sensing means, and cable installation means for installing the sensing means and the cable through the conduit and for placing the sensing means at the measurement location, the cable installation means being such that it includes means for propelling a fluid along the conduit, and the conduit being such that it contains a lead-in section for providing sufficient fluid drag on the cable as it enters the conduit from the cable installation means to ensure that the sensing means is able to be transported through the conduit.

The sensing means may be one or more optical fibre sensors. These optical fibre sensors may be sensors for measuring temperature, distributed temperature, pressure, acoustic energy, electric current, magnetic field, electric field, or a combination thereof.

The interrogation means may be instrumentation electronics.

The interrogation means may be an electro-optic electronic readout system suitable for interrogating the appropriate optical fibre sensors and may include one or more optical fibre amplifiers.

The cable may be one or more optical fibre cables.

The means for propelling a fluid may be a hydraulic pump.

The means for propelling a fluid may be a gas bottle or a compressor.

The conduit may be high-pressure tubing with an inside diameter and pressure rating to make it suitable for deploying sensors to remote locations.

The conduit may be steel hydraulic control line commonly used in the oil and gas industry having an external diameter of ⅛" to ¾" (3 mm to 19 mm). Alternatively, the conduit may be coiled tubing commonly used in the oil and gas industry having an external diameter of ¾" to 2" (19 mm to 50 mm) or greater.

The lead-in section should be long enough and straight enough so that fluid flow is sufficient to cause the cable and sensing means to be propelled into and continue to be propelled into the conduit while the fluid is flowing, without causing the cable to stall in the lead-in section.

The lead-in section preferably does not contain substantial bends having bend radii less than 100 times the internal cross-sectional radius of the lead-in section.

The lead-in section preferably does not contain bends which cause the cable, when tensioned in the conduit to engage multiple surfaces of the conduit and in which at least two of these surfaces are separated by a distance less than 10 times the internal cross-sectional diameter of the conduit.

The lead-in section is preferably a substantially straight section of tubing which is at least 2 meters long. The tubing may be a straight section of the conduit.

The lead-in section is preferably of such a design that if the conduit is detached from the lead-in section, and transport of the cable through the lead-in section commenced using the cable installation means, then the cable will continue to be transported through the lead-in section if a tensile load of up to 1 Newton is applied to the cable at the exit of the lead-in section for more than one minute, and where the cable will start to transport again if the motion of the cable is stalled at the exit of the lead-in section for more than two seconds.

The interrogation means need not be connected to the sensing means while the sensing means is transported through the conduit to the measurement location. In many instances it is preferable to remove the cable installation means and the lead-in section once the sensing means is located at the measurement location, to form a seal around the cable where it enters or exits from the conduit, and then to connect the cable to the interrogation means with a separate cable specially designed for surface cabling.

In some instances, it may be preferable to pump the sensing means and the cable through the conduit, and then to place the conduit such that the sensing means is located at the measurement location. An example is where the sensing means and cable is pumped into the conduit and then the conduit is subsequently lowered into an oil well in order to take a measurement. The conduit can then be removed from the oil well and lowered into one or more oil wells to repeat the measurement. It will be appreciated that it may be preferable to weight the conduit prior to lowering it into the oil well. The conduit when inserted into the oil well may be configured as a single channel from the surface into the oil well, or may be configured such that it extends into the oil well and then returns back to the surface again.

In a first embodiment of the invention, there is provided apparatus for the remote measurement of physical parameters, in which the cable installation means includes a lead element attached to the sensing means which ensures that the lead element is always able to contribute a net propelling force to avoid the sensing means from stalling or to overcome a temporary stalling of the sensing means while the fluid is flowing along the conduit. This is particularly advantageous when the sensor element is relatively stiff and cannot reliably circumvent bends in the conduit without touching the side walls of the conduit.

In a second embodiment of the invention, there is provided apparatus for the remote measurement of physical parameters, which apparatus includes a first port where fluid enters into the conduit, and first orifice means through which the cable is able to be progressively pulled while deploying the sensing means, and in which the orifice means is such that sufficient fluid flows through the conduit in order to transport the sensing means to the measurement location.

The first orifice means may comprise a deformable insert which can be deformed in order to provide a close fit around the cable as it is being pulled through the deformable insert. Such an arrangement is commonly referred to as a stuffing box, and is common in the oil industry in slickline operations.

The first orifice means may comprise a wireline injector suitably modified for small diameter cables such as optical fibre cables. Care must be taken with such an injector not to use grease which may coat the fibre and cause it to stick to the wall of the conduit.

The first orifice means may include a capillary, preferably of a material such as stainless steel, connected to the lead-in section through which the cable is able to be progressively pulled while deploying the sensing means. The capillary may preferably be designed to form a close fit around the cable to prevent excessive fluid escaping through the capillary. Its entry may preferably be shaped so as not to damage the cable.

The lead-in section may include a diameter restriction in order to reduce the pressure of the fluid at the end of the capillary where the cable enters into the lead-in section. The advantage is to reduce the backward force on the cable, to increase the forward drag on the cable at the capillary exit, and to reduce fluid loss through the capillary. The diameter restriction is preferably designed with an adiabatically reducing taper followed by an adiabatically increasing taper in order to minimise the overall pressure loss in the lead-in section as measured after and before the diameter restriction means.

In a third embodiment of the invention, there is provided apparatus for the remote measurement of physical parameters, which apparatus includes an exit port at the end of the lead-in section in order to increase the rate that fluid flows in the lead-in section and thus increase the fluid drag on the cable in the lead-in section.

The exit port may include a valve which is preferably closed once the sensing means has reached it.

The exit port may include a viscojet designed to ensure that the fluid flowing through the exit port does not create excessive turbulence in the conduit.

In a fourth embodiment of the invention, there is provided apparatus for the remote measurement of physical parameters, which apparatus includes a first port where the fluid enters into the lead-in section, a first orifice means and a second orifice means through which the cable is able to be progressively pulled while deploying the sensing means, and a second port for reducing the fluid flowing through the second orifice means, in which the design of the first and second orifice means is such that sufficient fluid flows through the conduit in order to transport the sensing means to the measurement location.

The second port may be connected to the means for propelling the fluid along the conduit. Such an arrangement is useful in oil well applications for reducing the risk of gases such as light hydrocarbons or hydrogen sulphide or other poisonous gases escaping from the conduit through the second orifice means.

The apparatus may include a plurality of orifice means, in which each orifice means contains at least one port for progressively reducing the fluid flowing through each orifice means from the conduit. The fluid flowing through each port may be regulated using valves or chokes.

According to a fifth embodiment of the invention, there is provided apparatus for the remote measurement of physical parameters, which apparatus includes a first port where the fluid enters into the conduit, a first orifice means through which the cable may be progressively pulled while deploying the sensing means, and in which the cable installation means includes pay out means for controlling the rate at which the cable deploys.

The pay out means is preferably controlled to limit the rate at which the cable is deployed, and to make the rate at which the cable is deployed independent of the fluid flow rate. It is important for reliable deployment to ensure that the rate at which the cable is deployed into the lead-in section is no greater than the rate at which the cable is being transported in subsequent sections of the conduit. Failure to observe this condition can lead to the cable "piling up" within the conduit—a condition which is difficult to cure.

The pay out means may include a wheel assembly for progressively pulling the cable through the first orifice means.

The pay out means may alternatively be located on the other side of the first orifice means and may limit the rate at which the cable is pulled through the first orifice means.

According to a sixth embodiment of the invention, there is provided apparatus for the remote measurement of physical parameters, in which the cable installation means includes a first port where the fluid enters into the conduit, and a sealed container for holding the sensing means and the cable prior to pumping the sensing means to the measurement location.

BRIEF DESCRIPTION OF THE DRAWINGS

Embodiments of the invention will now be described solely by way of example and with reference to the accompanying drawing in which.

DETAILED DESCRIPTION OF A PREFERRED EMBODIMENTS OF THE INVENTION

Figure 1:
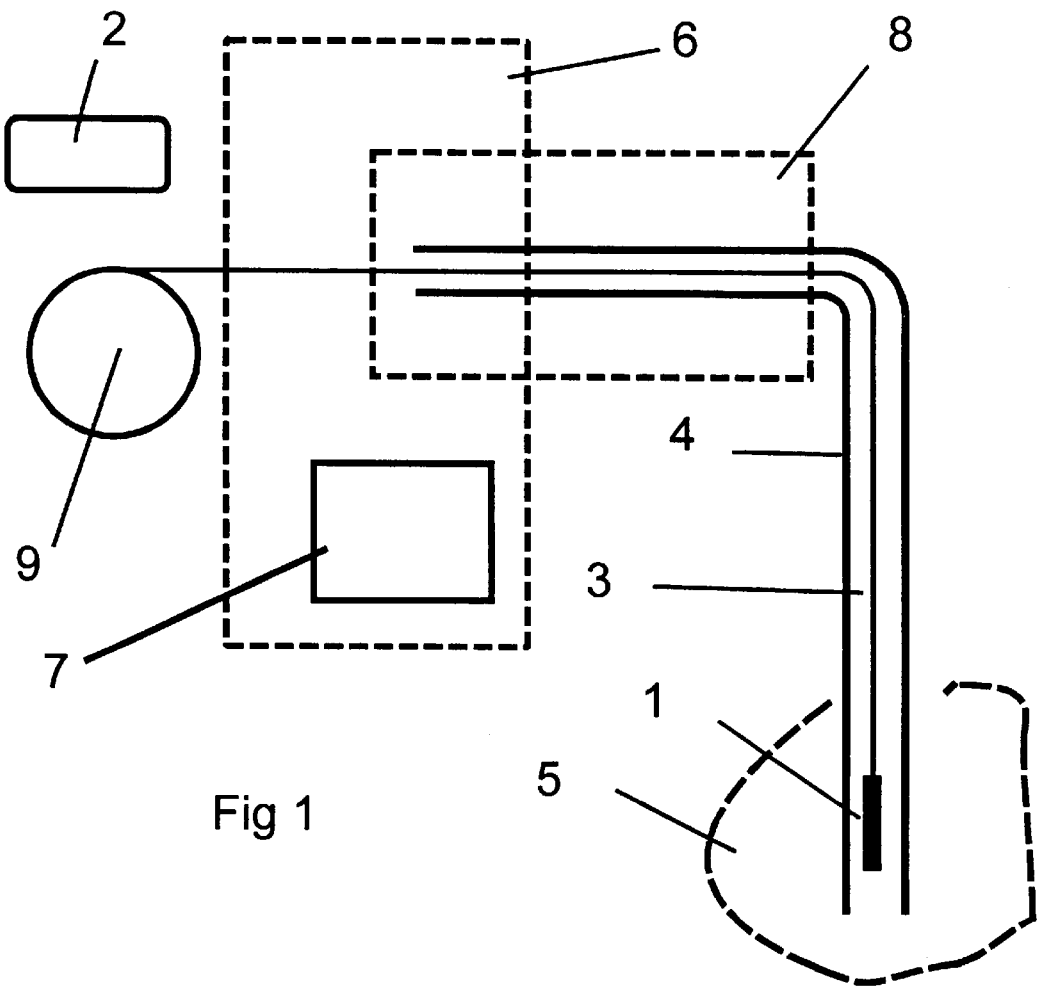
FIG. 1 is a diagram of an embodiment of the present invention.

With reference to FIG. 1, there is provided apparatus for the remote measurement of physical parameters, which apparatus comprises sensing means 1 for sensing one or more physical parameters, interrogation means 2 for interrogating the sensing means 1 and making a measurement, a cable 3 for extending between the sensing means 1 and the interrogation means 2, a conduit 4 for extending to a measurement location 5 and which is of such a cross-sectional size that it is able to accept the cable 3 and the sensing means 1, and cable installation means 6 for installing the sensing means 1 and the cable 3 through the conduit 4 and for placing the sensing means 1 at the measurement location 5, the cable installation means 6 being such that it includes means 7 for propelling a fluid along the conduit 4, and the conduit 4 being such that it contains a lead-in section 8 for providing sufficient fluid drag on the cable 3 as it enters the conduit 4 from the cable installation means 6 to ensure that the sensing means 1 is able to be transported through the conduit 4. The cable 3 is shown wound on a drum 9 in FIG. 1.

The sensing means 1 may be any sensor of a size and disposition that it can be pumped through the conduit 4. The sensing means 1 may be one or more optical fibre sensors. These optical fibre sensors may include sensors for measuring temperature, distributed temperature, pressure, acoustic energy, electric current, magnetic field, electric field, or a combination thereof.

The interrogation means 2 may be instrumentation electronics.

The interrogation means 2 may be an electro-optic electronic readout system suitable for interrogating the appropriate optical fibre sensors and may include one or more optical fibre amplifiers.

The cable 3 may be one or more optical fibre cables. These may be hermetically sealed with carbon coating, may have high-temperature coatings such as polyimide, or silicone or polytetrafluoroethelene, or may have combinations of these coatings.

The means 7 for propelling a fluid may be a hydraulic pump, a gas bottle, a gas compressor, a gas compressor linked to a container of liquid, or a combination thereof.

The fluid may be a gas such as nitrogen or methane.

The fluid may alternatively be a liquid such as water, a mixture of water and glycol (which is preferable for applications in areas where sub-zero temperatures occur frequently), a low-viscosity hydrocarbon oil, or a low-viscosity silicone or polysiloxane oil, or a perfluorocarbon fluid. Silicone or polysiloxane oils or perfluorocarbon fluids may be preferable for high-temperature applications where it is preferable to prevent water coming into contact with the cable 3. Following deployment using a fluid, the fluid may be replaced by one or more different fluids which may be preferable for the long-term preservation of the sensing means 1 and the cable 3. For example, it may be convenient to use demineralised water for the deployment of the cable 3. The water can be pumped out with an alcohol (such as isopropylalcohol) in order to dry the conduit 4 out, and then the alcohol displaced with dry nitrogen or a silicone oil.

The conduit 4 may be high-pressure tubing with an inside diameter and pressure rating to make it suitable for deploying sensors to remote locations.

The conduit 4 may be steel hydraulic control line commonly used in the oil and gas industry having an external diameter of 1/8" to 3/4" (3 mm to 19 mm). Alternatively, the conduit 4 may be coiled tubing commonly used in the oil and gas industry having an external diameter of 3/4" to 2" (19 mm to 50 mm).

The lead-in section 8 should be long enough and straight enough so that fluid flow is sufficient to cause the cable 3 and sensing means 1 to be propelled into and continue to be propelled into the conduit 4 while the fluid is flowing without causing the cable 3 to stall in the lead-in section 8.

The lead-in section 8 shall preferably have approximately the same internal diameter as the conduit 4 and there shall preferably be a smooth transition at the intersection between the lead-in section and the conduit 4.

The lead-in section 8 preferably does not contain substantial bends having bend radii less than 100 times the internal cross-sectional radius of the lead-in section 8. Such bends can lead to excessive frictional forces being applied to the cable 3 while the fluid is flowing leading to failure of the deployment of the sensing means 1.

The lead-in section 8 preferably does not contain bends which cause the cable 3 when tensioned in the lead-in section 8 to engage multiple surfaces of the lead-in section 8 and in which at least two of these surfaces are separated by a distance less than 10 times the internal cross-sectional diameter of the lead-in section 8.

The lead-in section 8 is preferably a substantially straight section of tubing which is at least 2 meters long. The tubing may be a straight section of the conduit 4.

The lead-in section 8 is preferably of such a design that if the conduit 4 is detached from the lead-in section 8, and the transport of the cable 3 through the lead-in section 8 commenced using the cable installation means 6, then the cable 3 will continue to be transported through the lead-in section 8 if a tensile load of up to 1 Newton is applied to the cable 3 at the exit of the lead-in section 8 for more than one minute, and where the cable 3 will start to transport again if the motion of the cable 3 is stalled at the exit of the lead-in section 8 for more than two seconds. This represents a good test as to whether the design of the lead-in section 8 will provide reliable deployments of sensors and cables. A further qualification is to attach a 1 m to 5 m length of tubing of similar cross-sectional design to the conduit 4 to the lead-in section 8 where the tubing is coiled with a diameter of around 10 cm and to repeat the pulling and the stalling tests. Additional qualification would be to replicate the path which the conduit 4 would take over a length which contains the majority of the initial bends and curves in the actual installation and to repeat the pulling and the stalling tests. This would be particularly advantageous prior to installing a sensing means 1 through a conduit 4 in an oil well because there are often sharp bends and loops within the well head.

It is convenient to use hydraulic control line in the lead-in section 8. It is often difficult to straighten hydraulic control line perfectly if it has been previously stored in a coiled form. The installation of the cable 3 and sensing means 1 will be reliable provided that hydraulic control line is not too distorted. For example, deployments of polyimide-coated fibre cables joined to optical fibre sensors can be achieved reliably through ¼" (6 mm) hydraulic control line when bends and kinks have been reduced such that the optical fibre cables would not have pressed against the side walls of the hydraulic control line along a 100 mm length of the hydraulic control line when the optical fibre cable is held straight. The fluid is preferably water and the fluid flow rate is preferably around 0.5 to 2 liters per minute.

The interrogation means 2 need not be connected to the sensing means 1 while the sensing means 1 is pumped through the conduit 4 to the measurement location 5. In many instances it is preferable to remove the cable installation means 6 and the lead-in section 8 once the sensing means 1 is located at the measurement location 5, form a seal around the cable 3 where it enters or exits from the conduit 4, and then connect the cable 3 to the interrogation means 2 with a separate cable specially designed for surface cabling.

In some instances, it may be preferable to pump the sensing means 1 and the cable 3 through the conduit 4, and then to place the conduit 4 such that the sensing means 1 is located at the measurement location 5. An example is where the sensing means 1 and cable 3 is pumped into the conduit 4 (which may be hydraulic control line or coiled tubing) which is then subsequently lowered into an oil well in order to take a measurement. The conduit 4 can then be removed from the oil well and lowered into one or more oil wells to repeat the measurement. It will be appreciated that it may be preferable to weight the conduit 4 prior to lowering it into the oil well. The conduit 4 when inserted into the oil well may be configured as a single channel from the surface into the oil well, or may be configured such that it extends into the oil well and then returns back to the surface again.

Figure 2:
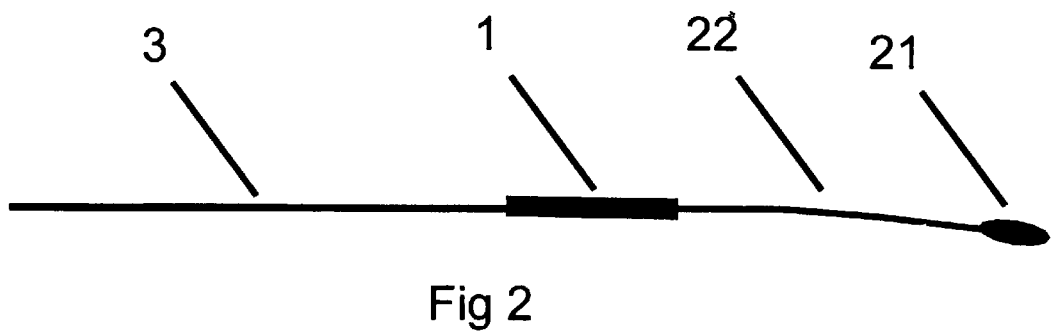
FIG. 2 is a diagram of an embodiment of the present invention in which the sensing means includes a lead element.
Figure 3:
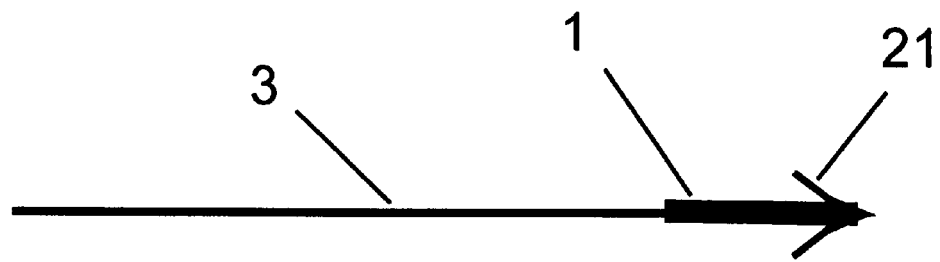
FIG. 3 is a diagram of an embodiment of the present invention in which the sensing means includes a lead element.

FIG. 2 shows an embodiment of the invention, in which the cable installation means 6 includes a lead element 21 attached to the sensing means 1 by a second cable 22 which ensures that the lead element 21 is always able to contribute a net propelling force to avoid the sensing means 1 from stalling or to overcome a temporary stalling of the sensing means 1 while the fluid is flowing along the conduit 4. This is particularly advantageous when the sensing element 1 is relatively stiff and causes significant friction as it circumvents bends in the conduit 4. The lead element 21 can either be attached to the sensing means 1 by the second cable 22, or be attached directly to the sensing means 1 as shown in FIG. 3.

The lead element 21 may be a pig, a piston, a drone or a parachute. The lead element 21 is preferably designed to prevent it from stalling against the side wall of the conduit 4 where the conduit 4 is bent. Such a design helps prevent a common failure in deploying sensors through hydraulic control lines containing bends and loops. Where bends and loops are encountered, there is a tendency for the leading section of the sensing means 1 or cable 3 to stop temporarily while the cable 3 following is still deploying. The consequence is that the cable 3 spirals around the side wall of the conduit 4, a situation which can be non-recoverable. Designs of the lead element 21 which keep the leading section off the side walls of the conduit help prevent this failure mechanism. A more preferable solution is to design the conduit 4 to avoid sharp bends wherever possible, but this may not always be possible in well heads for use in the oil industry.

The lead element 21 may also be a long length of flexible optical fibre.

Figure 4:
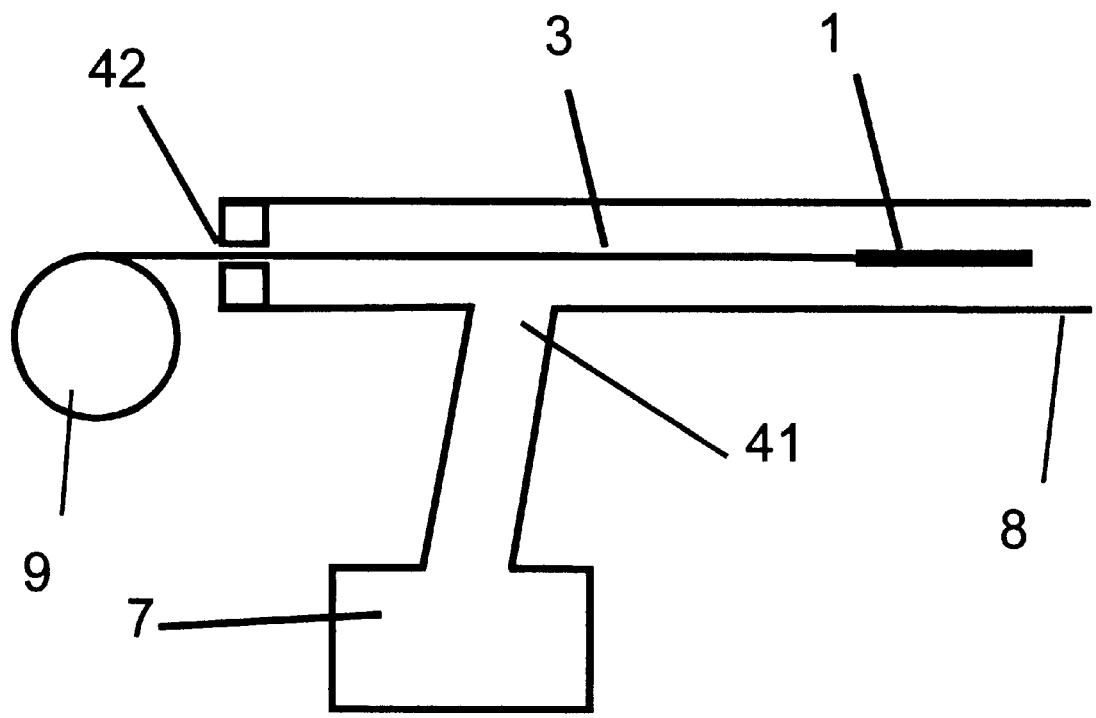
FIG. 4 is a diagram of an embodiment of the present invention in which the apparatus includes a first port and a first orifice means.

FIG. 4 shows an embodiment of the invention, where the apparatus includes a first port 41 where the fluid enters into the lead-in section 8, and a first orifice means 42 through which the cable 3 may be progressively pulled while deploying the sensing means 1, where the first orifice means 42 is such that sufficient fluid flows through the conduit 4 in order to transport the sensing means 1 to the measurement location 5.

In order for the cable 3 to be pulled through the orifice means 42, it is necessary to overcome opposing forces including the repelling force from the pressure differential from inside the lead-in section 8 to the ambient pressure, any frictional forces of the cable 3 against the first orifice means 42 or any fluid drag due to fluid exiting through the orifice means 42. These opposing forces are not excessive for thin fibre optic cables such as polyimide-coated optical fibre having an outer diameter of approximately 150 um. Nevertheless, the length of the lead-in section 8 typically needs to be greater than around 5 meters and needs to be free of rapid undulations. Such rapid undulations can cause the optical fibre to press against the wall of the lead-in section 8 inducing friction and also reducing the fluid drag on the optical fibre. This embodiment is suitable for deploying sensors through lengths of hydraulic control line in excess of 100 m. It should be noted that if applications require a longer length of the hydraulic control line, then the applied pressure needs to be increased to maintain the fluid flow rate through the conduit 4. Consequently the repelling forces increase, and it is preferable to increase the length of the lead-in section 8 to compensate.

Figure 5:
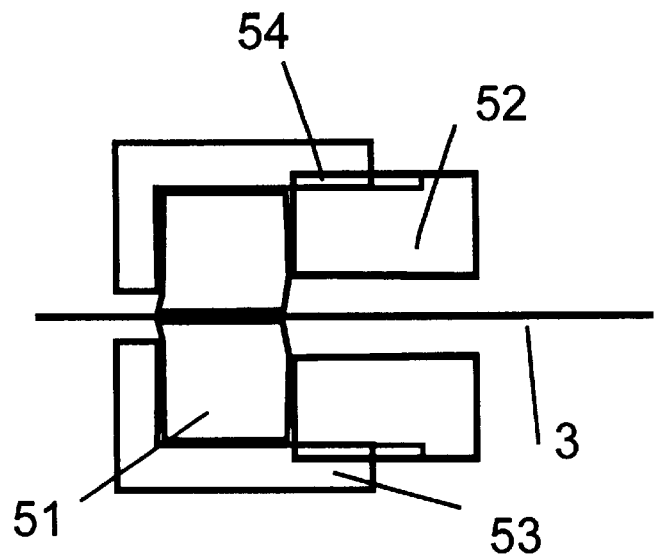
FIG. 5 is a diagram of an embodiment of the present invention in which the first orifice means is a stuffing box.

The first orifice means 42 may comprise a deformable insert 51 as shown in FIG. 5 which can be deformed in order to provide a close fit around the cable 3 as it is being pulled through the deformable insert 51. The deformable insert 51 is typically deformed by squeezing it between first metal plate 52 and second metal plate 53 connected by a screw thread 54. Such an arrangement is commonly referred to as a stuffing box, and is common in the oil industry in slickline operations.

The first orifice means 42 may comprise a wireline injector suitably modified for small diameter cables such as coated optical fibres.

Figure 6:
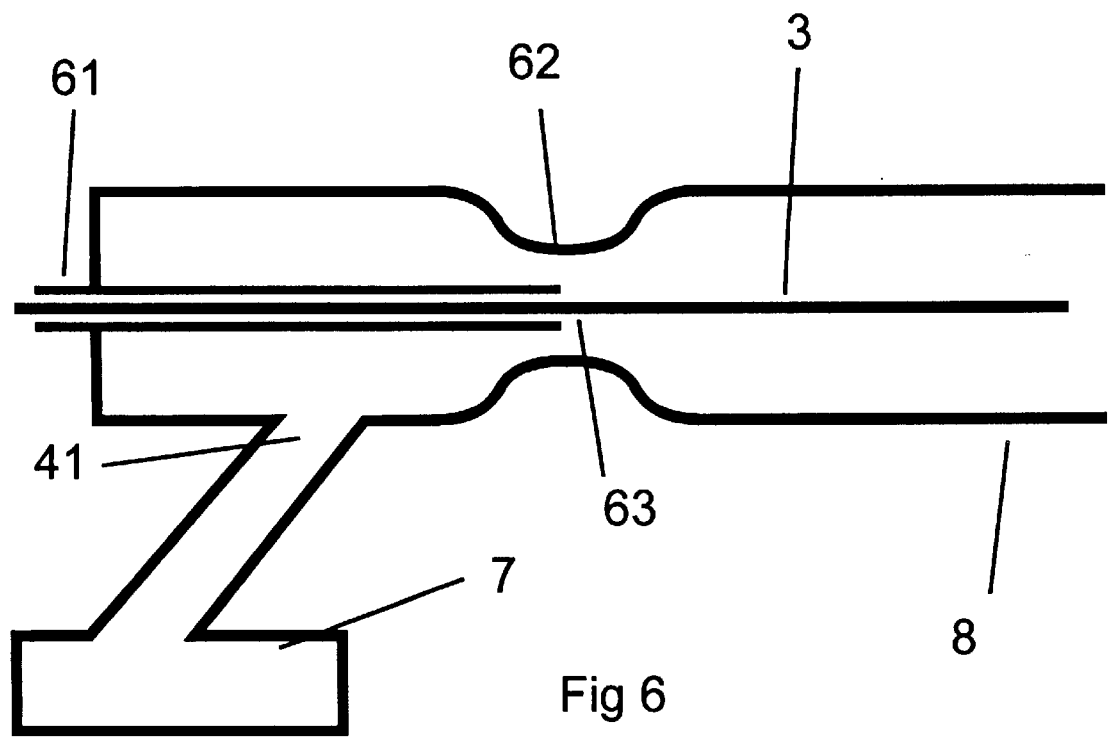
FIG. 6 is a diagram of an embodiment of the present invention in which the first orifice means includes a capillary.

The first orifice means 42 may include a capillary 61, as shown in FIG. 6, which is connected to the conduit 4 through which the cable 3 may be progressively pulled while deploying the sensing means 1. The capillary 61 may preferably be designed to form a close fit around the cable 3 to prevent excessive fluid escaping through the capillary 61 while the sensing means 1 is being deployed. The entry into the capillary 61 may preferably be shaped so as not to damage the cable 3. Such an embodiment relaxes the length requirement on the lead-in section 8. The straight section needs to be greater than around 4 meters for deploying typical optical fibre cables through ¼" (6 mm) hydraulic control line with flow rates of around 0.5 to 2 liters per minute.

FIG. 6 also shows a diameter restriction 62 in the lead-in section 8 in order to reduce the pressure of the fluid at the end of the capillary 61 where the cable 3 enters into the lead-in section 8. The advantage is to reduce the backward force on the cable 3, to increase the forward drag on the cable 3 at the exit 63 of the capillary 61, and to reduce fluid loss through the capillary 61. The diameter restriction 62 is preferably designed with an adiabatically reducing taper followed by an adiabatically increasing taper in order to minimise the overall pressure loss in the lead-in section 8 as measured after and before the diameter restriction 62.

Figure 7:
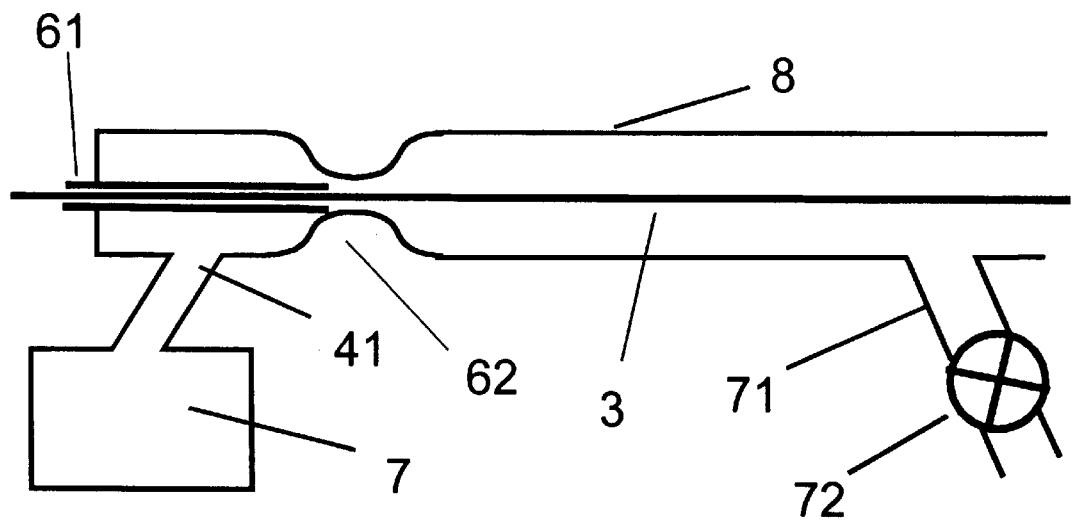
FIG. 7 is a diagram of an embodiment of the present invention in which the apparatus includes an exit port at the end of the lead-in section means.

FIG. 7 shows an embodiment of the invention, where the apparatus includes an exit port 71 at the end of the lead-in section 8 in order to increase the rate that fluid flows in the lead-in section 8 and thus increase the fluid drag on the cable 3. This has the advantage of relaxing the length requirement on the lead-in section 8.

The exit port 71 may include a valve 72 which is preferably closed once the sensing means 1 has been positioned at the measurement location.

The exit port 71 may include a viscojet (not shown) designed to ensure that the fluid flowing through the exit port 71 does not create excessive turbulence in the conduit 4.

Figure 8:
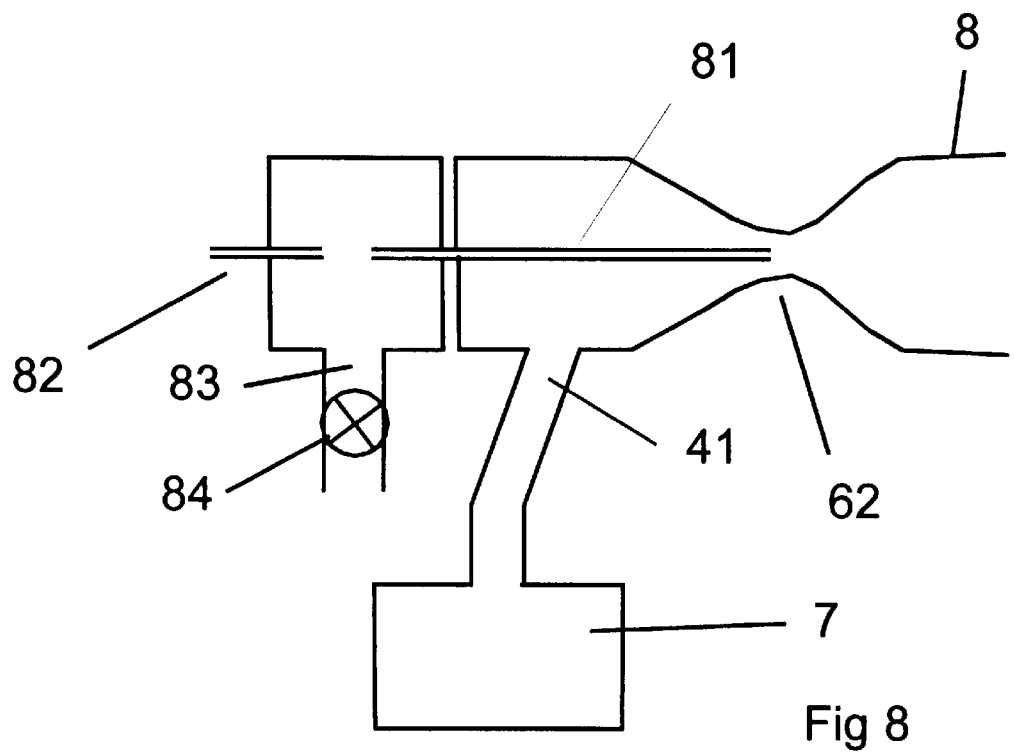
FIG. 8 is a diagram of an embodiment of the present invention in which the apparatus includes first and second orifice means.

FIG. 8 shows an embodiment of the invention, where the apparatus includes a first port 41 where the fluid enters into the lead-in section 8 and a first and second orifice means 81 and 82 through which the cable 3 may be progressively pulled while deploying the sensing means 1, where the design of the first and second orifice means 81 and 82 is such that sufficient fluid flows through the conduit 4 in order to transport the sensing means 1 to the measurement location 5. A second port 83 is shown between the first and second orifice means 81 and 82 for reducing the fluid flowing from the lead-in section 8 through the second orifice means 82 while the sensing means 1 is transported to the measurement location 5. The fluid flowing through the second port 83 may be controlled using a valve 84 or a choke.

Figure 9:
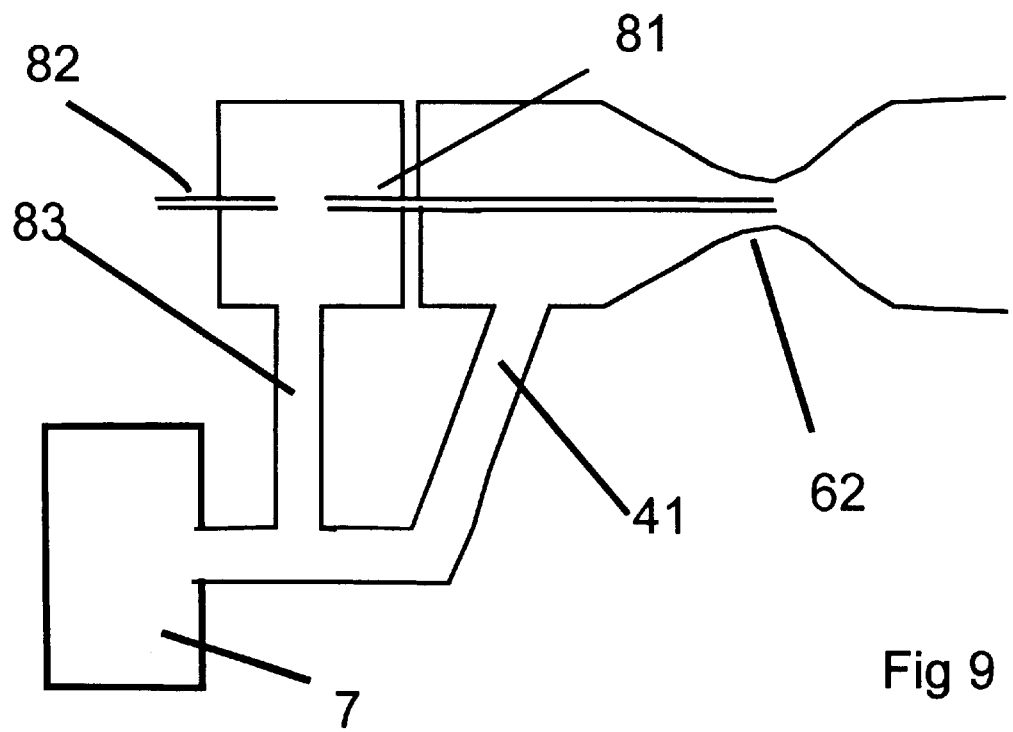
FIG. 9 is a diagram of an embodiment of the present invention in which the apparatus includes a second port means.

The second port 83 may be connected to the means 7 for propelling the fluid along the conduit 4 as shown in FIG. 9. Such an arrangement is useful in oil well applications for reducing the risk of gases such as light hydrocarbons or hydrogen sulphide or other poisonous gases escaping from the conduit 4 through the second orifice means 82.

The apparatus may include a plurality of orifice means 82 and in which each orifice means 82 contains at least one port 83 for progressively reducing the fluid flowing through each orifice means 82 from the lead-in section 8. The fluid flowing through each port 83 may be regulated using a plurality of valves 84.

The design of the lead-in section 8 should be similar to that described for FIG. 6.

Figure 10:
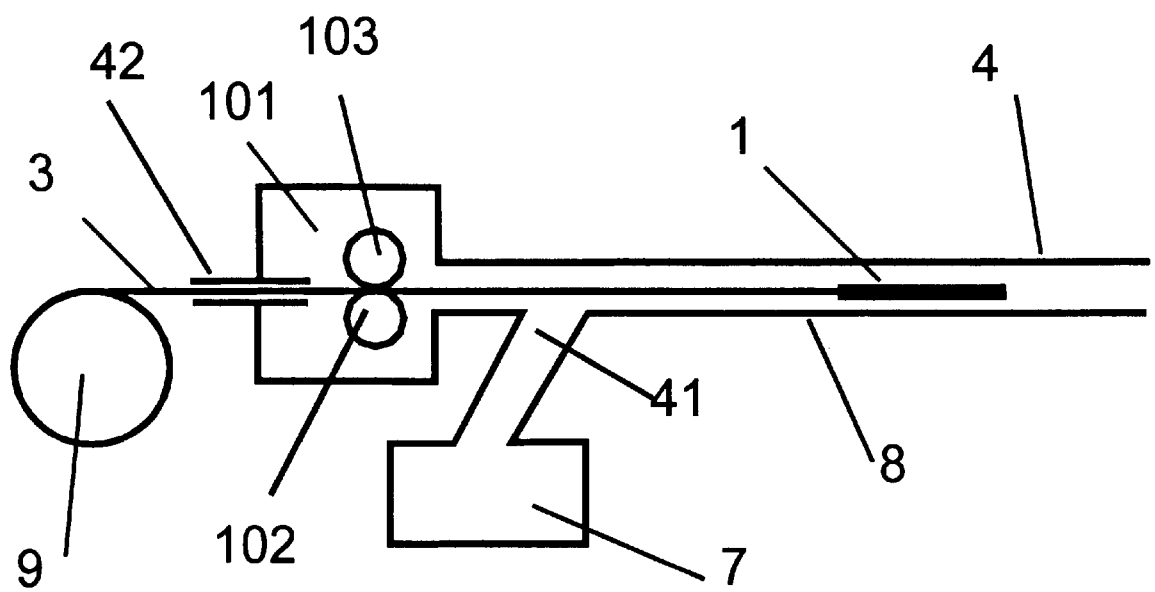
FIG. 10 is a diagram of an embodiment of the present invention in which the apparatus includes a pay out means.

FIG. 10 shows an embodiment of the invention, where the apparatus includes a first port 41 where the fluid enters into the lead-in section 8, a first orifice means 42 through which the cable 3 may be progressively pulled while deploying the sensing means 1, and where the cable installation means includes a pay out means 101 for controlling the rate at which the cable 3 deploys. The pay out means 101 comprises a powered wheel 102 and a wheel 103 which grip the cable 3 and pull it through the orifice means 42. The pay out means 101 is preferably controlled to limit the rate at which the cable 3 is deployed, and to make the rate at which the cable 3 is deployed independent of the fluid flow rate.

This embodiment has the advantage that the wheels 102, 103 overcome the opposing forces in the orifice means 42. It is therefore possible to relax the length requirement on the lead-in section 8. The lead-in section 8 should preferably be straight and should preferably be longer than 3 m.

Moreover, it is possible to deploy sensors through longer lengths of hydraulic control line than is possible in the embodiments described in FIGS. 2 to 9. We have demonstrated deploying sensors through 10,000 psi (69MPa) rated ¼" (6 mm) hydraulic control line with a pressure drop per unit length as low as 0.3 psi/m (2 kPa/m). This extrapolates to a deployment distance through the conduit 4 of 30 km being achievable with this embodiment.

Figure 11:
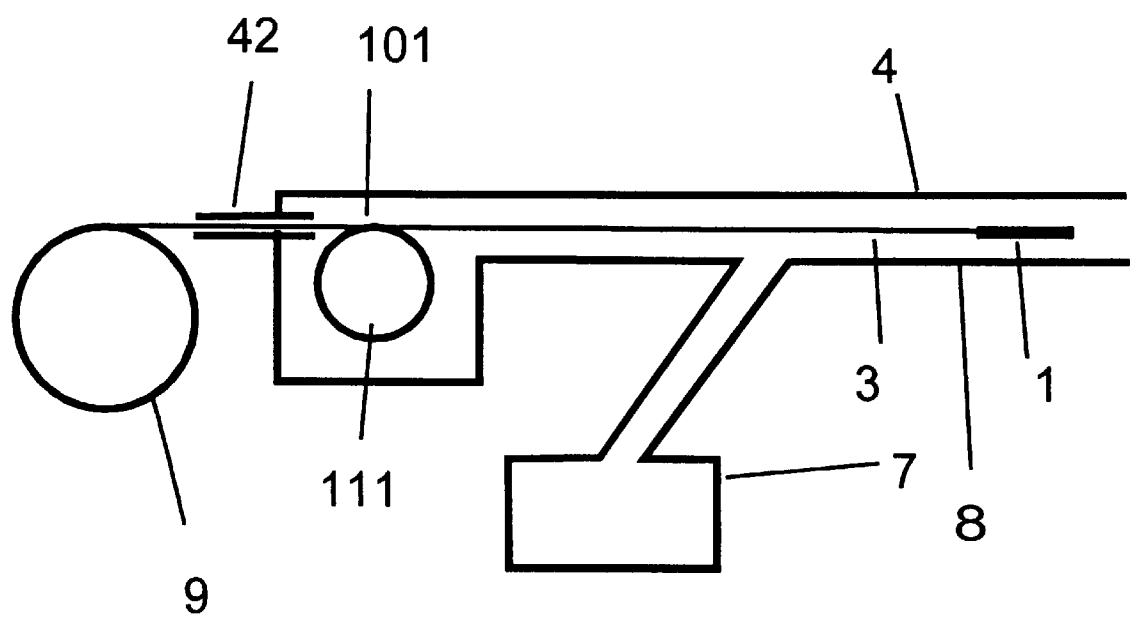
FIG. 11 is a diagram of an embodiment of the present invention in which the apparatus includes a pay out means.

FIG. 11 shows a preferred embodiment of the pay out means 101 which comprises a wheel 111 powered by a motor (not shown) around which the cable 3 is wrapped. The advantage of this approach is that the cable 3 will only be pulled through the first orifice means 42 if the cable 3 is tensioned by the fluid flowing in the conduit 4. Thus if the demand for cable 3 to be deployed stops temporarily the friction of the cable 3 on the wheel 111 will reduce significantly and the cable 3 will stop being pulled through the orifice means 42. It should be noted here that deployment will only start again if the lead-in section 8 is sufficiently straight and long that sufficient tension can be induced in the cable within the lead-in section 8 by fluid drag such that the cable 3 will grip the wheel 111 again. If it is found that the lead-in section 8 is not sufficiently long and the deployment has stalled, then it is often possible to restart deployment by pulsing the pressure of the fluid in the conduit 4, or by preventing further deployment of the cable 3 over the wheel 111 and increasing or pulsing the flow of fluid through the conduit 4.

By way of example, the fluid may be water and the first orifice means 42 may be a steel capillary, 20 mm long and may have an internal diameter of around 0.5 mm to 1 mm, an arrangement which prevents excessive loss of fluid through the capillary and allows deployment over many kilometres of ¼" hydraulic steel tubing and 800 um outer diameter optical fibre. This implementation is attractive for deploying an optical fibre such as used for measuring temperature profiles with a distributed temperature sensor such as the York DTS 80 manufactured by York Sensors Ltd in England. Such an installation may be conducted by having the optical fibre wound in a container such as a spool or bobbin, winding it around the wheel 111, feeding a two meter length of fibre into the hydraulic steel tubing through the capillary, turning on a water pump to drive water through the conduit 4 via the first port 41 (for example a T-piece), and driving the wheel 111 to pull fibre off the bobbin as the fibre is deployed through the hydraulic tubing. The cable installation means 6 may be removed taking care not to damage the optical fibre, and the optical fibre can be interfaced to the interrogation means 2 which in this instance is the York DTS80. It may be convenient to seal the hydraulic tubing around the optical fibre in order to prevent fluid loss. In practice it is preferable to keep the first meter or two of the hydraulic tubing following first port 41 as straight as possible.

Figure 12:
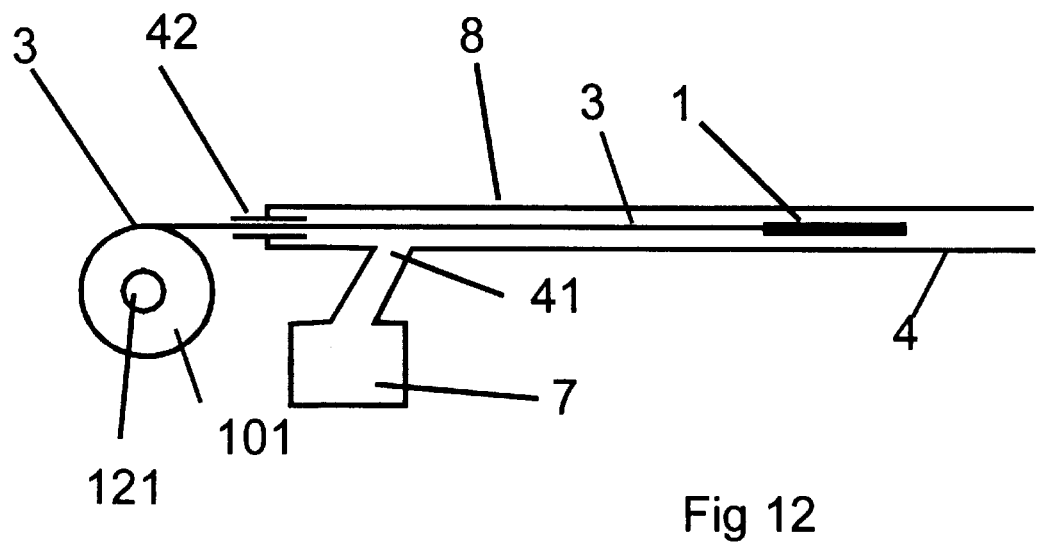
FIG. 12 is a diagram of an embodiment of the present invention in which the pay out means is not immersed in the fluid.

The pay out means 101 may alternatively be located the other side of the first orifice means 42 as shown in FIG. 12. Here the pay out means 101 comprises a drum 121 whose speed may be controlled by a motor (not shown). The rate of deployment can also be limited by a brake mechanism, a friction mechanism, or may be simply controlled by the operator placing his hand on the drum 121 to prevent the cable 3 and sensing means 1 deploying too quickly.

Figure 13:
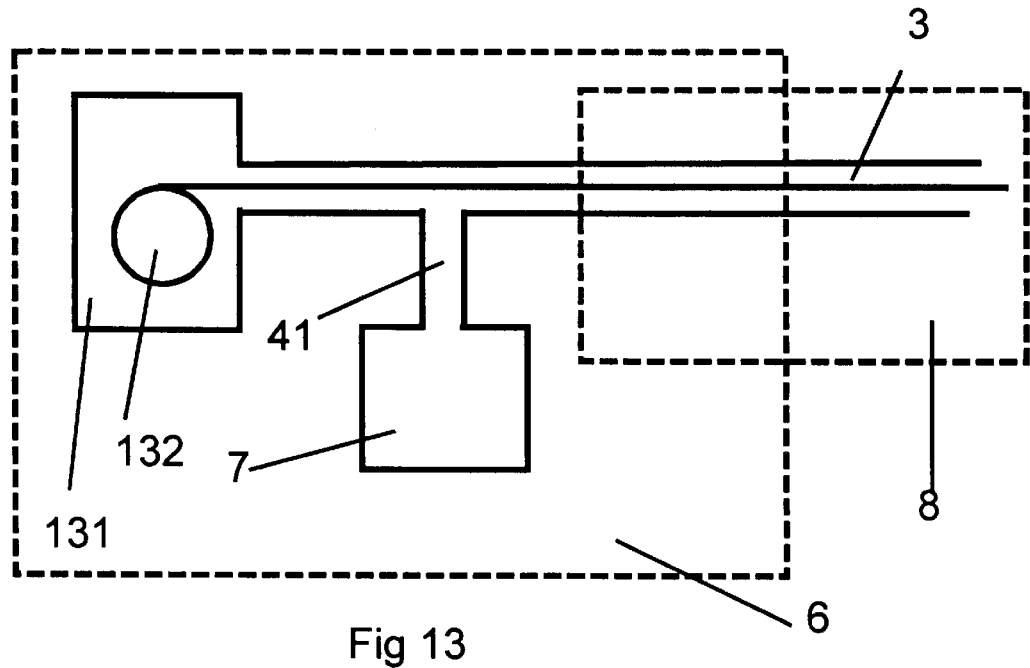
FIG. 13 shows apparatus including sealed container means.

FIG. 13 shows an embodiment of the invention where the cable installation means 6 includes a first port 41 where the fluid enters into the conduit 4, and a sealed container 131 for holding the sensing means 1 and the cable 3 prior to pumping the sensing means 1 to the measurement location 5. The cable 3 is held on a cable holder 132 prior to deployment except for a short length of cable 3 which is introduced into the lead-in section 8 prior to pumping the fluid. This embodiment is preferred for deploying sensors into high-pressure oil or gas wells, or subsea oil and gas wells.

The cable holder 132 may be a rotating cable drum holder which rotates as the cable 3 is pulled off it. The end of the cable 3 which is not being deployed through the conduit 4 may be connected to interrogation means 2 (not shown) through a high-pressure, fibre-optic rotary joint such as a Model 145 manufactured by Focal Technologies of Nova Scotia, Canada. This may be advantageous if it is desired to monitor the deployment of the sensing means 1 and the cable 3 by, for example, time domain reflectometry.

Optical time domain reflectometry can be used to monitor the deployment of optical fibre cable because of the increased attenuation of the optical fibre cable on the rotating cable drum. The lower attenuation of the optical fibre cable which has been dispensed off the cable holder 132 can be very noticeable, particularly for multimode optical fibre or monomode optical fibre operating in a regime where bend losses are noticeable. (These bend losses would also be noticeable in the embodiment shown in FIG. 11 where the fibre cable is wrapped around the wheel 111.)

The cable holder 132 may be connected to a brake mechanism (not shown) in order to restrain the cable 3 as it is transported through the conduit 4. The brake mechanism may comprise magnets acting on a copper disk to induce eddy currents and thereby provide resistance to the cable 3 as it is being deployed.

The brake mechanism may be driven by an external motor (not shown) coupled to the cable holder 132 via a high-pressure bearing or via a magnetic clutch. It is preferable that the motor is configured to provide constant torque (and not constant velocity) on the cable 3 as it is being deployed.

The cable holder 132 may alternatively be a cassette where the cable 3 is wound either on the inside of the cassette or the outside of the cassette and the cable 3 is pulled off without rotating the cassette. Examples of such cassettes are found in wire guided missiles and torpedoes where it is important that communication through the wire is maintained after launching.

Figure 14:
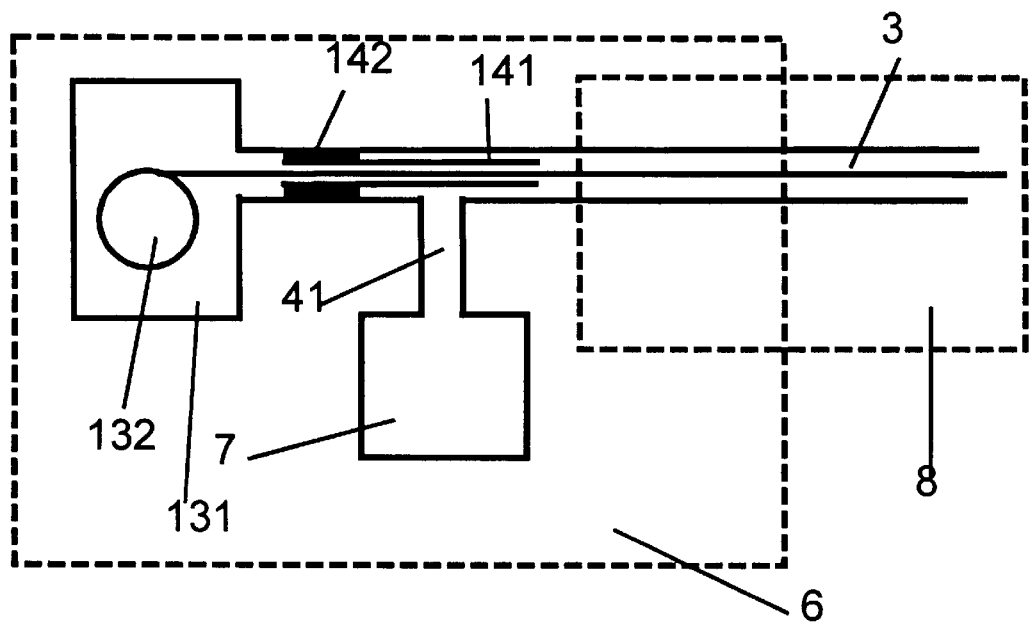
FIG. 14 shows apparatus including a sealed container and a capillary.

The cable installation means 6 may include a short length of capillary 141 as shown in FIG. 14 to provide better entrainment of the cable 3 as it enters the lead-in section 8. The capillary 141 is attached to the conduit 4 by means 142.

Figure 15:
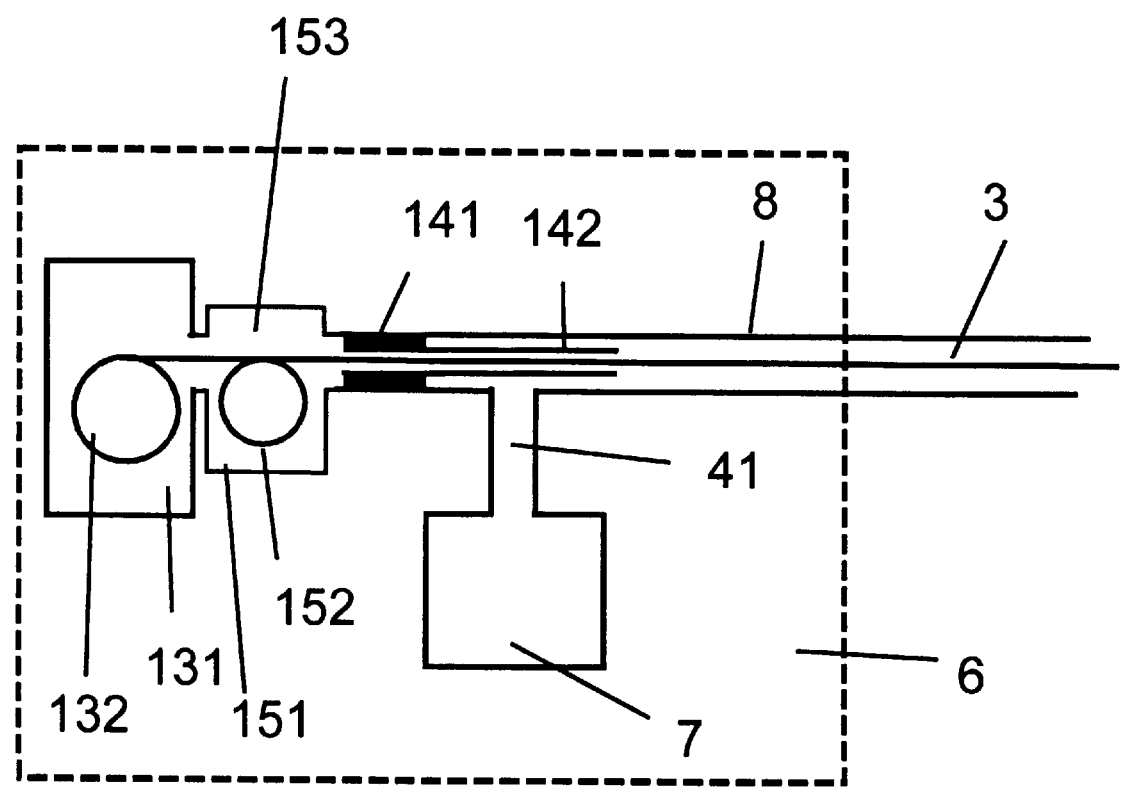
FIG. 15 shows apparatus including a sealed container and a pay out means.

The cable installation means 6 may also include a pay out means 151 as shown in FIG. 15 comprising a wheel assembly 152 housed in a pay out container 153. The purpose of the pay out means 151 is to control the rate at which the cable 3 enters into the lead-in section 8 independent of the fluid flow rate. The wheel assembly 152 may comprise a wheel around which the cable is wrapped. The wheel may be driven by an external motor which drives the wheel either through a high-pressure bearing or via a magnetic clutch. The friction between the wheel and the cable 3 provides the force to pull the cable 3 off the cable holder 132. This friction will only be large enough to pull the cable 3 off the cable holder 132 if sufficient drag is being induced by the fluid on the cable 3—particularly in the lead-in section 8 during the early stages of deployment. It is found that a straight lead-in section 8 of around 2 m is sufficient to ensure reliable deployment.

It will be appreciated that it is not always possible to provide enough space for a straight lead-in section 8. An alternative in these cases is to reduce the straight section to around 0.5 m in total, and to lead it very gently into a large loop containing several meters of conduit 4. If the conduit 4 is ¼" (6 mm) hydraulic control line, then the minimum bend radius should be no less than around 0.5 m—although a 1 m bend radius would be preferable. Normal plumbing practice would be to form right angle bends of around 1" (25 mm) bend radius to provide a compact installation unit. Such right angle bends placed near to the first port 41 will lead to unreliable deployment of the cable 3 and can prevent the cable 3 from deploying. It should be noted that undulations in the hydraulic control line should be straightened as much as possible.

Figure 16:
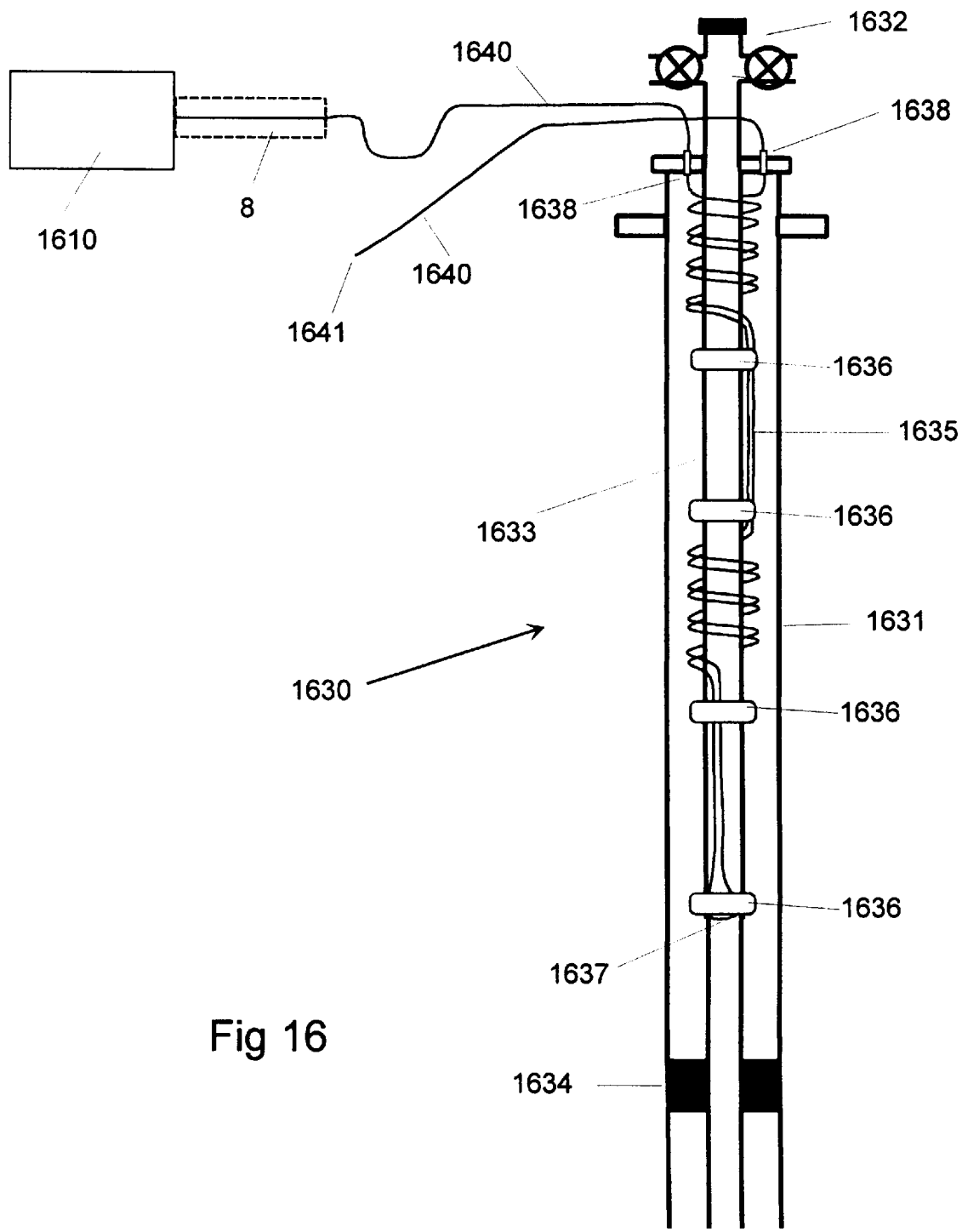
FIGS. 16 and 17 show application in oil wells.

FIG. 16 shows an example of how the embodiment shown in FIG. 4 maybe used for deploying sensors into an oil well 1630, comprising a casing 1631, a well head 1632, a length of production tubing 1633 through which oil flows from a reservoir (not shown) to the surface, and a packer 1634 for isolating the pressure from the reservoir from the surface. A hydraulic control line 1635 is strapped to the production tubing 1633 using straps 1636. The hydraulic control line 1635 passes down the oil well 1630, turns around at the U-bend 1637, and passes back up the oil well again. The hydraulic control line 1635 exits the well head 1632 via ports 1638. It is usual to find that the hydraulic control line 1635 is wrapped several times around the production tubing 1633 within the well head 1632, although these wraps are not shown in FIG. 16.

FIG. 16 also shows the hydraulic control line 1635 wrapped around the production tubing 1633 several times which may be advantageous for some sensing applications, for example for increasing the resolution of thermal profiling. This may be particularly important when the oil well 1630 contains an electrically submersible pump which is driven by a motor. It would be advantageous to wrap the hydraulic control line 1635 around both the pump and the motor in order to increase the effective spatial resolution of a thermal profiling sensor which may be installed into the hydraulic control line 1635 using the apparatus described in the present invention.

The deployment apparatus 1610 for installing sensors through the hydraulic control line 1635 can be one of the preceding embodiments which must be selected for its applicability. All of these embodiments require the lead-in section 8 which is shown separately in FIG. 16. For example, if the oil well 1630 is a low-pressure oil well, and the hydraulic control line 1635 is ¼" (6 mm) steel hydraulic control line and is not too long (for example 100 m) then the embodiment shown in FIG. 4 can be used, with a lead-in section 8 of around 5 m in length—the precise figure depending on the stiffness and diameter of the cable 3. However, if the length of hydraulic control line 1635 is significantly longer (for example 3 km), then the embodiments shown in FIG. 10 to 15 are preferred. Depending on the exact embodiment, the length of the lead-in section 8 can then be reduced to around 2 m.

It will be appreciated that if a sensor is to measure the pressure within the production tubing 1633, then it is necessary to communicate pressure from the production tubing 1633 to the hydraulic control line 1635. This can be achieved with a small orifice which would preferably contain a device to restrict the flow from the hydraulic control line 1635 to the production tubing 1633 while the sensor is being installed. Alternatively, the pressure communication can be achieved with a wireline-deployable valve such as is known in the oil and gas industry.

In use, the hydraulic control line 1635 would be installed into the oil well 1630 as the production tubing 1633 is being lowered into the ground. The installation of the oil well 1630 would then be completed and the sensors installed into the hydraulic control line 1635 at a convenient time later. This is achieved, by connecting the deployment apparatus 1610 to the oil well 1630 with external hydraulic control line 1640, and pumping the sensor through the hydraulic control line 1635 and the external hydraulic control line 1640 using fluid. The fluid can be collected at the far end 1641 by a vessel (not shown) which may be designed so that the entire deployment apparatus 1610, hydraulic control line 1635 and the external hydraulic control line 1640 is a sealed system. If a sensor were to fail during or subsequent to its installation, it can be pumped out of the hydraulic control line 1635, the hydraulic control line 1635 cleaned (for example by pumping through solvents, a plug of wire wool or a combination of both) and a replacement sensor installed using the deployment apparatus 1610.

Following the installation of the sensor, the external hydraulic conduit 1640 is removed taking care not to sever the fibre optic cable, and the fibre-optic cable connected to the interrogation means 2 with a separate cable designed for external cabling. Alternatively, it may be convenient to form the connection to the interrogation means 2 using fibre optic cable which is pumped through hydraulic control line using the deployment apparatus 1610.

In many installations, the hydraulic control line 1635 may experience high pressures subsequent to the installation of the sensing means 1. In these cases, it is preferable to include a splice chamber (not shown) at or near the well head such that the cable 3 may be spliced to a high-pressure fibre optic seal which in turn is connected to the interrogation means 2 via a separate cable. In order to gain access to the cable 3 for fusion splicing, it is preferable that the splice chamber is of such a diameter that it can contain several meters of fibre-optic cable. Fire-proofing safety requirements can be satisfied by separately protecting the splice chamber with an external casing. It will be appreciated that in order to gain access to the cable 3 for fusion splicing, it is necessary to isolate the well pressure. This can be achieved either by pumping a higher-density fluid into the hydraulic control line 1635 through a port (which can be provided in the splice chamber), or by forming an annular seal around the fibre inside the conduit 4 by using, for example, a valve which contains an elastic deformable element.

Figure 17:
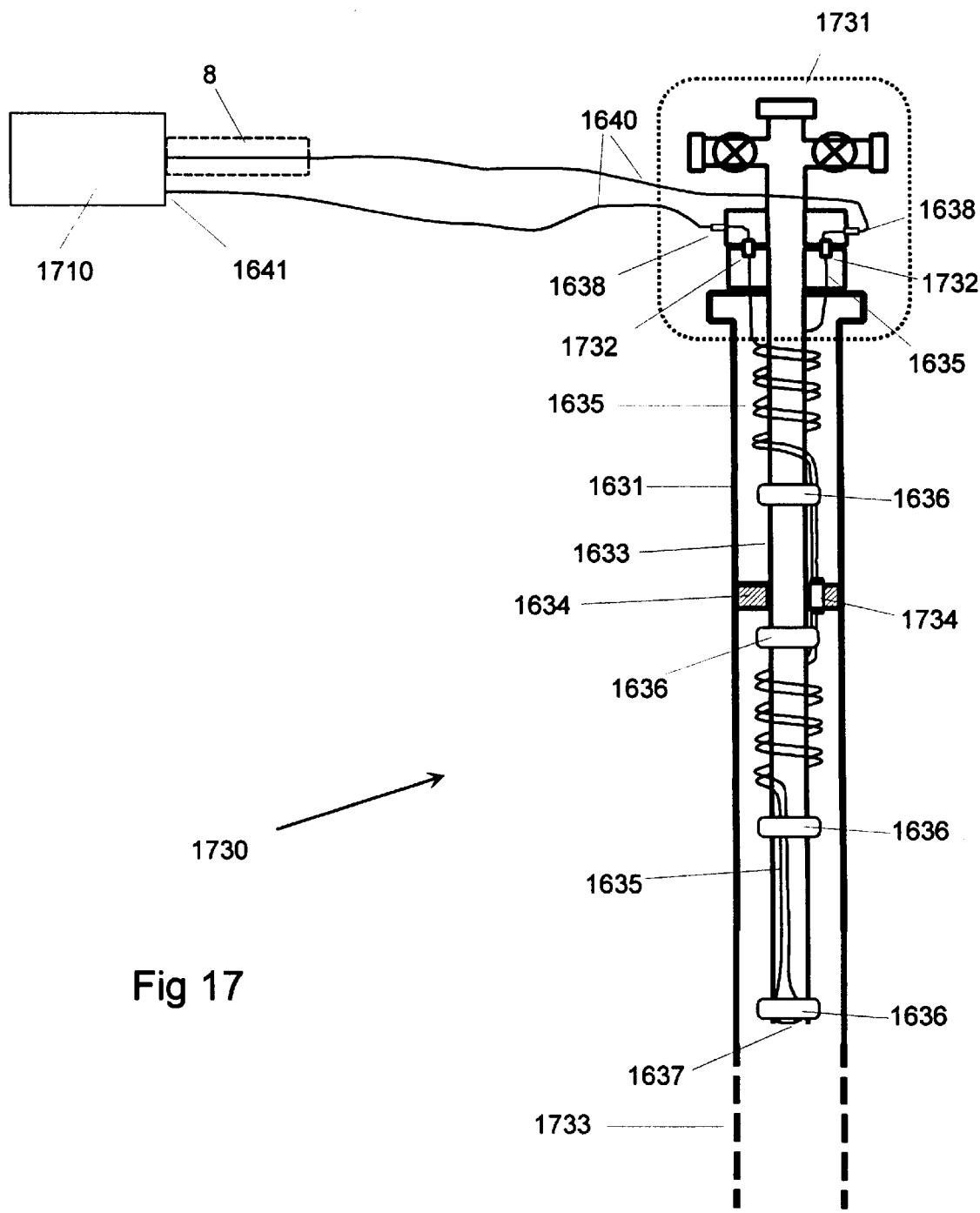

FIG. 17 shows an example of how the deployment apparatus 1710 shown in FIG. 15 may be used for deploying sensors into an oil well 1730. The lead-in section 8 is shown separately. The embodiment is particularly useful where for high-pressure wells, subsea wells, or wells where the length of the hydraulic conduit 1635 is very long (greater than 1 km). FIG. 17 shows the channel formed by the hydraulic conduit 1635 penetrating the packer 1634 such that a sensing means 1 (not shown) can make measurements near the perforations 1733 where oil flows from the reservoir into the production tubing 1633. This is achieved using a packer penetrator 1734.

The far end 1641 of the hydraulic conduit 1640 is shown routed back to the deployment apparatus 1710 in order to form a closed system. The deployment apparatus 1710 can be located on or conveniently near the well head 1731, on a platform or on the sea bed.

The designs and procedures for installing the hydraulic conduit 1635, the clamps 1636, and the packer penetrators 1734 are known in the oil industry and are used frequently for installing control lines either for chemical injection or for the hydraulic actuation of downhole valves or mechanical actuation devices used in so-called "smart wells" which are currently being developed by several oil-field service companies. Technology also exists for drilling spurs into the formation around the oil well 1730 into which coiled tubing can be inserted. Such coiled tubing can contain the conduit 4 so that a sensing means 1 can be placed to make measurements (such as acoustic, seismic, temperature or pressure) within the formation, reducing influence of the fluid flow in the production tubing 1633.

It should be noted that whereas the packer penetrator 1734 is shown penetrating the packer 1634 directly, a channel through the packer 1634 could equally bypass the packer 1634 via a sleeve which could be inserted near the packer 1634 using wireline techniques. An alternative approach would be to pump the sensing means 1 through channels in the casing 1631.

The well shown has a well head 1731 similar to that used in subsea completions containing stab connectors 1732 which are mated when the well head is lowered into place. FIG. 17 also shows a packer penetrator 1734 which allows the channel formed by the hydraulic conduit 1635 to pass through the packer 1634.

The deployment apparatus 1710 would also be useful for deploying sensors into high-pressure wells, or in wells where the length of the hydraulic control line 1633 is very long (500 m to 3 km, or up to 30 km as oil-well drilling technologies improve)

Figure 18:
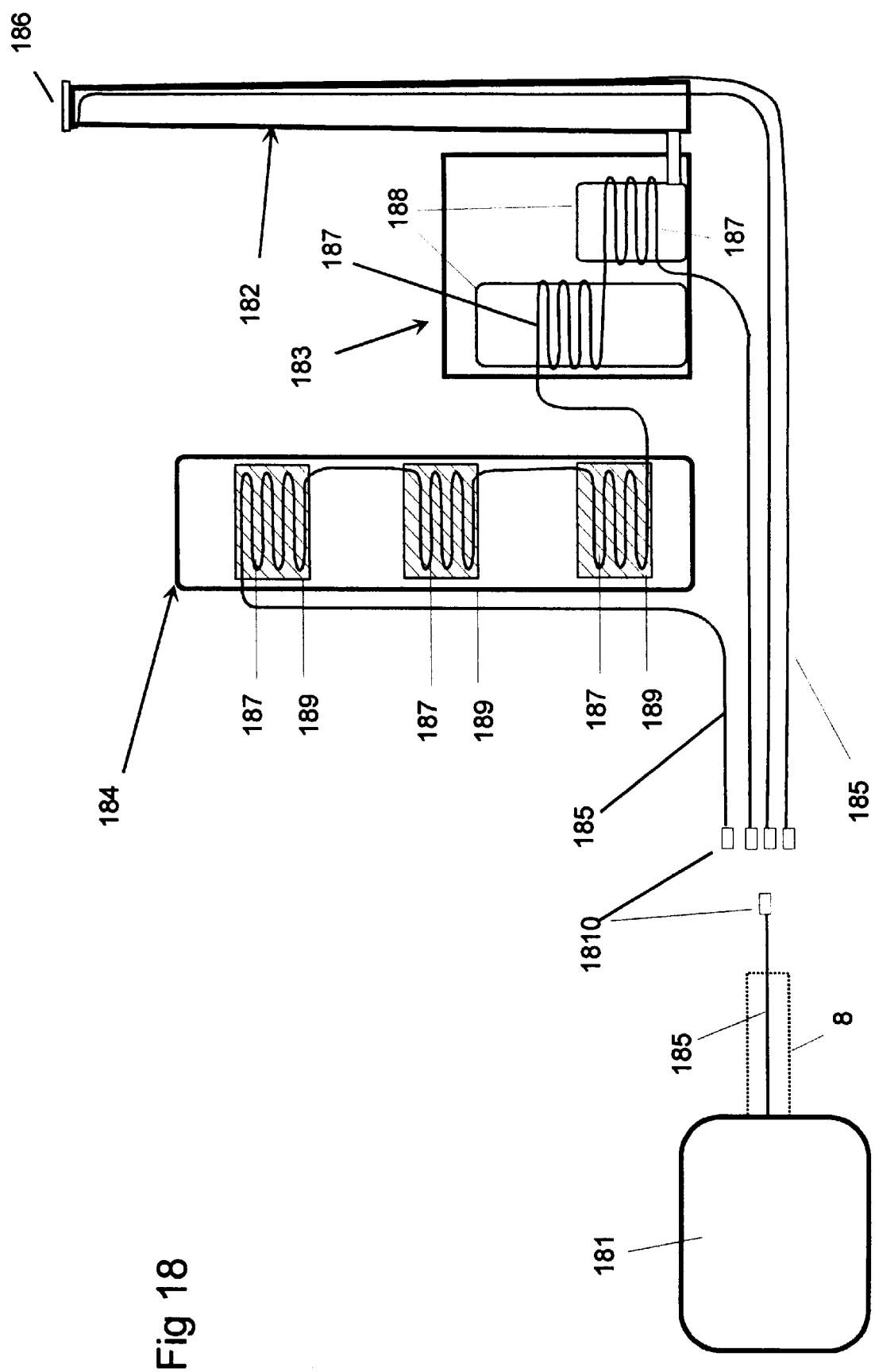
FIG. 18 shows application in oil refineries.

FIG. 18 shows how a deployment apparatus 181 can be used to pump a sensing means 1 (not shown) for stack monitoring in a stack 182, for process monitoring in process plant 183, or for monitoring reactions in catalytic converters 184. Hydraulic control lines 185 are routed up the stack 182 to a measurement location 186 where an interface (not shown) to enable the sensing means 1 to measure outputs from the stack 182 is required. The interface may be a thermal path for the measurement of temperature, or may include a window to enable optical or infra-red gas sensors to monitor stack emissions, or may include a sampling chamber to enable gas sensors (including non-optical) to monitor stack emissions. FIG. 18 also shows the hydraulic control line 185 being routed through process vessels 188 where it forms loops 187 in order to increase the number of points that can be sampled by the sensing means 1 pumped through the hydraulic control line 185. The monitoring of catalytic converters 189 by forming loops 187 also increases the number of points that can be sampled by the sensing means 1. Connectors 1810 allow the operator to select the hydraulic control line 185 through which the sensing means 1 is to be deployed. The hydraulic control line 185 can be manufactured from steel, titanium, or materials which are chemically inert and can withstand high pressures.

It is to be appreciated that the embodiments of the invention described above with reference to the accompanying drawings have been given by way of example only and that modifications and additional components maybe provided to enhance the performance of the apparatus.

What is claimed is:

1. Apparatus for the remote measurement of physical parameters, which apparatus comprises sensing means for sensing one or more physical parameters, interrogation means for interrogating the sensing means and making a measurement, a cable for extending between the sensing means and the interrogation means, a conduit for extending to a measurement location and which is of such a cross-sectional size that it is able to accept the cable and the sensing means, and cable installation means for installing the sensing means and the cable through the conduit and for placing the sensing means at the measurement location, the cable installation means being such that it includes means for propelling a fluid along the conduit, and the conduit being such that it contains a lead-in section for providing sufficient fluid drag on the cable as it enters the conduit from the cable installation means to ensure that the sensing means is able to be transported through the conduit, in which the cable installation means includes a first port where fluid enters into the conduit, and first orifice means through which the cable is able to be progressively pulled while deploying the sensing means, and in which the first orifice means is such that sufficient fluid flows through the conduit in order to transport the sensing means, and in which the first orifice means includes a capillary connected to the lead-in section.

2. Apparatus according to claim 1 in which the first orifice means includes a diameter restriction in order to reduce the pressure of the fluid at the end of the capillary.

3. Apparatus according to claim 1 wherein the lead-in section does not contain substantial bends having bend radii less than 100 times the internal cross-sectional radius of the lead-in section.

4. Apparatus according to claim 3 wherein the bends do not cause the cable when tensioned in the conduit to engage multiple surfaces of the conduit and in which at least two of these surfaces are separated by a distance less than 10 times the internal cross-sectional diameter of the conduit.

5. Apparatus according to claim 1 wherein the lead-in section is a substantially straight section of tubing which is at least 2 meters long.

6. Apparatus according to claim 1 wherein the cable installation means includes a lead element attached to the sensing means.

7. Apparatus according to claim 1 further comprising a second orifice means and a second port for reducing the fluid flowing through the second orifice means, and wherein the second orifice means is such that the cable is able to be progressively pulled through the second orifice means while pumping the sensing means to the measurement location.

8. Apparatus according to claim 1 wherein the cable comprises a carbon coated optical fiber.

9. Apparatus according to claim 8 wherein the fluid is replaced by a different fluid after the sensing means has been placed at the measurement location.

10. Apparatus according to claim 1 wherein the fluid is replaced by a different fluid after the sensing means has been placed at the measurement location.

11. Apparatus according to claim 1 wherein the cable installation means includes pay out means for controlling the rate at which the cable deploys.

12. Apparatus for the remote measurement of physical parameters, which apparatus comprises sensing means for sensing one or more physical parameters, interrogation means for interrogating the sensing means and making a measurement, a cable comprising a carbon coated optical fiber for extending between the sensing means and the interrogation means, a conduit for extending to a measurement location and which is of such a cross-sectional size that it is able to accept the cable and the sensing means, and cable installation means for installing the sensing means and the cable through the conduit and for placing the sensing means at the measurement location, the cable installation means being such that it includes means for propelling a fluid along the conduit, and the conduit being such that it contains a lead-in section for providing sufficient fluid drag on the cable as it enters the conduit from the cable installation means to ensure that the sensing means is able to be transported through the conduit.

13. Apparatus according to claim 12 wherein the fluid is replaced by a different fluid after the sensing means has been placed at the measurement location.

14. Apparatus according to claim 12 wherein the cable installation means includes a first port where fluid enters into the conduit, and first orifice means through which the cable is able to be progressively pulled while deploying the sensing means, and wherein the orifice means is such that sufficient fluid flows through the conduit in order to transport the sensing means.

15. Apparatus according to claim 14 wherein the first orifice means includes a capillary in series with the lead-in section.

16. Apparatus according to claim 15 wherein the first orifice means includes a diameter restriction in order to reduce the pressure of the fluid at the end of the capillary.

17. Apparatus according to claim 12 wherein the cable installation means includes a sealed container for holding the sensing means and the cable.

18. Apparatus for the remote measurement of physical parameters, which apparatus comprises sensing means for sensing one or more physical parameters, interrogation means for interrogating the sensing means and making a measurement, a cable for extending between the sensing means and the interrogation means, a conduit for extending to a measurement location and which is of such a cross-sectional size that it is able to accept the cable and the sensing means, and cable installation means for installing the sensing means and the cable through the conduit and for placing the sensing means at the measurement location, the cable installation means being such that it includes means for propelling a fluid along the conduit, and the conduit being such that it contains a lead-in section for providing sufficient fluid drag on the cable as it enters the conduit from the cable installation means to ensure that the sensing means is able to be transported through the conduit, and in which the fluid is replaced by a different fluid after the sensing means has been placed at the measurement location.

19. Apparatus according to claim 18 wherein the cable is an optical fiber cable.

20. Apparatus for the remote measurement of physical parameters, which apparatus comprises sensing means for sensing one or more physical parameters, interrogation means for interrogating the sensing means and making a measurement, a cable comprising an optical fiber for extending between the sensing means and the interrogation means, a conduit for extending to a measurement location and which is of such a cross-sectional size that it is able to accept the cable and the sensing means, and cable installation means for installing the sensing means and the cable through the conduit and for placing the sensing means at the measurement location, the cable installation means being such that it includes means for propelling a fluid along the conduit, and the conduit being such that it contains a lead-in section for providing sufficient fluid drag on the cable as it enters the conduit from the cable installation means to ensure that the sensing means is able to be transported through the conduit, and wherein the lead-in section is of such a design that if the conduit is detached from the lead-in section, and the transport of the cable through the lead-in section commenced using the cable installation means, then the cable will continue to be transported through the lead-in section if a tensile load of up to 1 Newton is applied to the cable at the exit of the lead-in section for more than one minute, and where the cable will start to transport again if the motion of the cable is stalled at the exit of the lead-in section for more than two seconds.

21. Apparatus for the remote measurement of physical parameters, which apparatus comprises sensing means for sensing one or more physical parameters, interrogation means for interrogating the sensing means and making a measurement, a cable comprising an optical fiber for extending between the sensing means and the interrogation means, a conduit for extending to a measurement location and which is of such a cross-sectional size that it is able to accept the cable and the sensing means, cable installation means for installing the sensing means and the cable through the conduit and for placing the sensing means at the measurement location, the cable installation means being such that it includes means for propelling a fluid along the conduit, and the conduit being such that it contains a lead-in section for providing sufficient fluid drag on the cable as it enters the conduit from the cable installation means to ensure that the sensing means is able to be transported through the conduit, wherein the cable installation means includes a first port where fluid enters into the conduit, and a plurality of orifice means through which the cable is able to be progressively pulled while deploying the sensing means, and wherein each orifice means contains at least one port for progressively reducing the fluid flowing through each orifice means from the conduit.

* * * * *